United States Patent
Indefrey et al.

(10) Patent No.: US 6,851,067 B2
(45) Date of Patent: Feb. 1, 2005

(54) CURRENT DRIVEN SERIAL BUS SYSTEM HAVING AN ENERGY SAVING MODE

(75) Inventors: Klaus Indefrey, Nuremberg (DE); Bernhard Wiesgickl, Vilseck (DE)

(73) Assignee: Siemens Aktiengesellschaft, Munich (DE)

( * ) Notice: Subject to any disclaimer, the term of this patent is extended or adjusted under 35 U.S.C. 154(b) by 603 days.

(21) Appl. No.: 09/788,498

(22) Filed: Feb. 21, 2001

(65) Prior Publication Data
US 2001/0047491 A1 Nov. 29, 2001

(30) Foreign Application Priority Data

Feb. 22, 2000 (DE) .......................................... 100 08 081

(51) Int. Cl.[7] .............................................. G06F 1/00
(52) U.S. Cl. ....................... 713/324; 713/320; 713/323; 713/340
(58) Field of Search ................................ 713/322–340, 713/320, 310; 710/305–306, 105–106, 110, 385, 313, 262, 267, 268; 318/138–139

(56) References Cited

U.S. PATENT DOCUMENTS

| | | | | |
|---|---|---|---|---|
| 5,781,585 A | * | 7/1998 | Dorner et al. ............... 375/224 |
| 5,883,446 A | * | 3/1999 | Yuth ........................... 307/130 |
| 5,892,893 A | * | 4/1999 | Hanf et al. ..................... 714/1 |
| 6,091,527 A | | 7/2000 | Brisse et al. |
| 6,148,409 A | * | 11/2000 | Mores .......................... 713/330 |
| 6,160,842 A | * | 12/2000 | DeLong et al. .............. 375/219 |
| 6,282,668 B1 | * | 8/2001 | Neudecker ................... 713/324 |
| 6,519,720 B1 | * | 2/2003 | Mores ........................... 714/43 |
| 6,542,947 B1 | * | 4/2003 | Buhring ....................... 710/107 |

* cited by examiner

Primary Examiner—Paul R. Myers
Assistant Examiner—Raymond N Phan
(74) Attorney, Agent, or Firm—Harness, Dickey & Pierce, P.L.C.

(57) ABSTRACT

Two measures are provided in order to allow a serial bus system to be operated such that it is resistant to interference and defects, and such that it operates with low power consumption. Firstly, each transmitted digital signal is interpreted as a logic zero or a logic one, respectively, when a first or a second predetermined current waveform, respectively, is applied to a bus line. Secondly, the bus system is operable in an energy saving mode, in which either no data transmissions at all are made, or in which data transmissions are made only rarely, between the individual bus modules.

17 Claims, 1 Drawing Sheet

CURRENT DRIVEN SERIAL BUS SYSTEM HAVING AN ENERGY SAVING MODE

The present application hereby claims priority under 35 U.S.C. § 119 on German Patent Application No. 10008081.2, filed Feb. 22, 2000, the entire contents of which are hereby incorporated herein by reference for all purposes.

FIELD OF THE INVENTION

The present invention relates to a serial bus system having a bus master and at least one bus slave which are connected to one another via at least one bus line. In particular, it relates to a bus system in accordance with the AS-i specification, with the bus system being operable in a normal mode in which, at the latest after a normal cycle time has elapsed, the bus master transmits digital signals to the at least one bus slave, and the at least one bus slave transmits digital signals back to the bus master after each such transmission, with each of the transmitted digital signals being interpreted as a logic zero when a first predetermined current waveform is applied to the bus line, with each of the transmitted digital signals being interpreted as a logic one when a second predetermined current waveform, which is different to the first predetermined current waveform, is applied to the bus line.

BACKGROUND OF THE INVENTION

Such a bus system (the AS-i bus system in accordance with EN 50 295 is a typical example of this) is highly resistant to interference and defects. It is thus widely used for rugged industrial purposes. As a rule, such a bus system is supplied from an electrical main system via intermediate power supply devices.

In contrast, different bus systems are generally used for a battery powered bus system. This applies in particular to systems which need to be able to react to external influences at any time. This is because, in the bus system of this generic type, a data transfer is always required, which would excessively quickly exhaust a battery owing to the comparatively high power load. The bus systems used for battery powered bus systems can be operated in a manner which is resistant to interference and defects only with considerable complexity in comparison to the AS-i bus.

SUMMARY OF THE INVENTION

The object of the present invention is to provide a bus system which, firstly, has low power consumption so that it can also be used for battery power, and which can nevertheless be operated easily in a manner which is resistant to interference and defects.

The object is achieved in that the bus system of this generic type is developed further such that it can also be operated in an energy saving mode in which the bus master does not transmit any digital signals to the at least one bus slave within the normal cycle time.

It is possible that, in the energy saving mode and at the latest after any energy saving cycle time has elapsed, which is longer than the normal cycle time, the bus master transmits digital signals to the at least one bus slave. The at least one bus slave then transmits digital signals back to the bus master after each such transmission. If required, such an energy saving mode may even have a number of energy saving stages. However, it is even better if the bus master no longer transmits any digital signals to the at least one bus slave in the energy saving mode.

Switching back to the normal mode is particularly simple if, in the energy saving mode, at least one bus slave monitors the bus line for the application of the first and/or of the second predetermined current waveform and switches back to the normal mode on detection of the application of the first and/or of the second predetermined current waveform.

If, at least in the energy saving mode, the first and/or second predetermined current waveform can be applied automatically to the bus line by the at least one bus slave, and if, in the energy saving mode, the bus master monitors the bus line for the application of the first and/or of the second predetermined current waveform, and if the bus master switches back to the normal mode on detection of the application of the first and/or of the second predetermined current waveform, the process of switching back to the normal mode can also be initiated by the bus slave. In particular, this allows continuous monitoring for external input signals.

The bus master can transmit a switching signal to the at least one bus slave in order to switch to the energy saving mode. Alternatively, the at least one bus slave can monitor for the end of the normal cycle time, and can switch to the energy saving mode automatically when the normal cycle time elapses.

If a predetermined zero current level is applied to the bus line in order to apply the first predetermined current waveform during a zero time, and a predetermined one current level is applied to the bus line in order to apply the second predetermined current waveform during a one time which is different to the zero time the production of two mutually different current waveforms can be achieved easily in terms of circuitry.

If there is a current pause between the application of the zero current level and the application of the one current level, data transmission is even more resistant to interference and defects.

If the zero current level is equal to the one current level, this further simplifies the circuitry implementation.

The problems resulting from battery supply are particularly applicable in motor vehicles which are intended to be parked for lengthy periods. This is because, in the case of modern motor vehicles, the burglar alarm system and the central locking system, in particular, must be operated all the time while, on the other hand, the automobile battery must not be discharged even after several weeks.

BRIEF DESCRIPTION OF THE DRAWINGS

Further advantages and details result from the following description of an exemplary embodiment and drawings in which, illustrated in principle.

DETAILED DESCRIPTION OF PREFERRED EMBODIMENT

Figure 1:
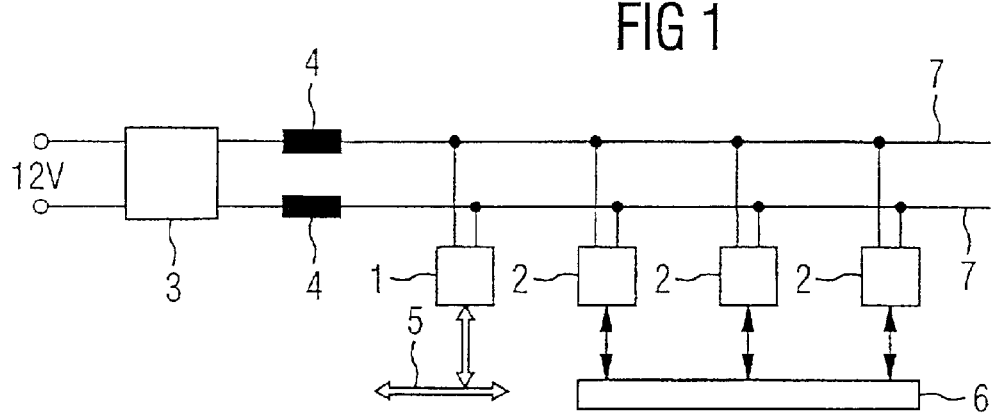
FIG. 1 shows a serial bus system.

According to FIG. 1, a bus system has a bus master 1 and bus slaves 2. In this case, there are three bus slaves 2 in the exemplary embodiment. However, in principle, a greater or lesser number of bus slaves 2 could also be connected to the bus master 1.

The bus modules 1, 2, that is to say the bus master 1 and the bus slaves 2, are supplied with electrical power via a power supply unit 3 with downstream inductors 4 and power supply lines 7 from a 12 V automobile battery in a passenger-carrying vehicle, for example. The bus master 1 is connected to further bus systems via a vehicle bus 5, for example a CAN bus. The further bus systems are not illustrated in FIG. 1, for the sake of brevity and clarity. These may be constructed in the same way as, or else differently from, the bus system illustrated in FIG. 1. The bus slaves 2 detect input signals from a unit 6 in the motor vehicle, for example from a vehicle door, or emit output signals to this unit 6. The bus system is thus used to control the unit 6 in the motor vehicle, for example, as already mentioned, a door module.

According to FIG. 1, the bus modules 1, 2 are also connected to one another for data transmission purposes via the power supply lines 7. The bus system is in consequence in the form of a serial bus system. If required, one of the power supply lines 7 could even be dispensed with and replaced by a ground connection. According to the exemplary embodiment, the bus system is preferably a bus system in accordance with the AS-i specification.

In normal operation, the bus master 1 cyclically and successively transmits digital signals to each of the bus slaves 2. After each such transmission, the addressed bus slave 2 then likewise transmits digital signals back to the bus master 1. The cyclic data transmission and the maximum bus extent, which is predetermined on a system-specific basis, thus ensure that each bus slave 2 receives digital signals transmitted from the bus master 1, and transmits digital signals back to the bus master 1, at the latest after a normal cycle time has elapsed. The type of data transmission will in this case be explained in more detail in the following text in conjunction with FIGS. 2 and 3.

Figure 2:
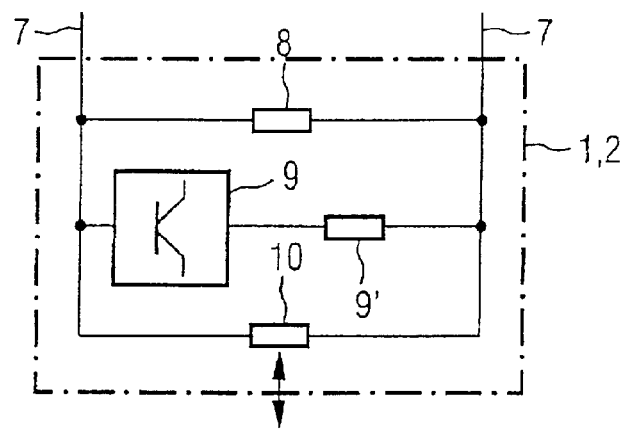
FIG. 2 shows a bus module.

According to FIG. 2, each of the bus modules 1, 2 bridges the power supply lines 7 with a high-value resistor 8 and a switching element 9, in addition to a current limiting resistor 9' connected upstream or downstream thereof. Furthermore, the power supply lines 7 are connected to a control circuit 10 for the respective bus module 1, 2. The resistor 8 is chosen to be sufficiently large that the loss current flowing via the resistor 8 is negligibly small. The resistor 8 is used only to detect the potential difference between the power supply lines 7.

Figure 3:
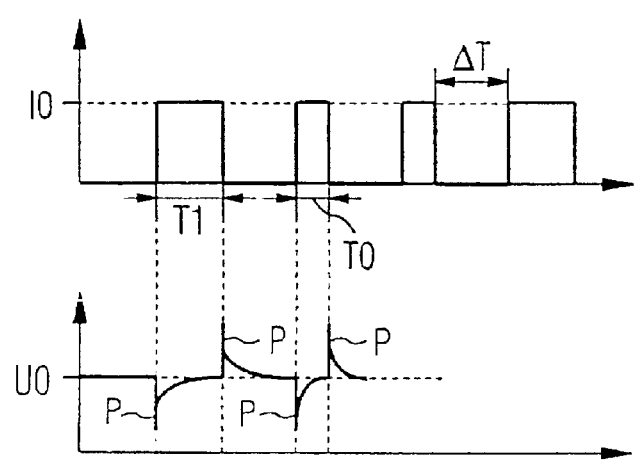
FIG. 3 shows data transmission.

According to FIG. 3, for data transmission of a one signal, the switching element 9 is actuated by the control circuit 10 during a one time T1 so that current with a current level I0 flows through the switching element 9 and thus into the power supply lines 7 during the one time T1. In order to transmit a digital zero, the switching element 9 is likewise actuated in such a manner that the current level I0 flows, but this time during a zero time T0. The times T0, T1 are different from one another. Furthermore, they are separated by a current pause ΔT. These two mutually different waveforms allow a logic zero and a logic one to be distinguished from one another.

An operating voltage U0 is generally dropped across the power supply lines 7. Owing to the inductors 4, voltage pulses P are superimposed on this operating voltage U0, due to the current waveforms. The voltage pulses P are detected by the other bus modules 1, 2 via their resistors 8. The interval between two voltage pulses P makes it possible to detect whether the digital signal being transmitted must be interpreted as a logic zero or as a logic one.

To the extent described so far, the bus system as shown in FIGS. 1 to 3 complies with the AS-i protocol. In this case and in accordance with EN 50 295, the normal cycle time is 5 ms.

However, according to the invention, the bus system can also be operated in an energy saving mode. In this energy saving mode, the bus master 1 either transmits no digital signals at all to the bus slaves 2, or else transmits digital signals only at considerably longer time intervals than is otherwise the case. The bus master 1 therefore does not necessarily transmit any digital signals to the bus slaves 2 within the normal cycle time.

For example, it is possible for the bus master 1 to transmit a switching signal to the bus slaves 2, and for the bus slaves 2 then to switch to the energy saving mode. After this, the bus master 1 completely ceases any further transmission of digital signals. The bus slaves 2 then monitor the power supply lines 7 just for the current pulses P, which corresponds to the application of one of the digital signals. When they detect such a digital signal, they switch back to the normal mode.

According to the AS-i Standard EN 50 295, the bus slaves 2 cannot initiate data transmission. They can only react to a data transmission from the bus master 1. Thus, according to the AS-i standard, the bus slaves 2 cannot automatically apply a current waveform with the current level I0 to the power supply lines 7. If, when it is in the energy saving mode, the bus master 1 also monitors the power supply lines 7 for the application of a current with a current level I0—or, corresponding to this, for the occurrence of the voltage pulses P—and switches back to the normal mode on detection of these voltage pulses P, then it is also possible to allow such automatic application of the current waveform by the bus slave 2. This makes sense in particular when the bus system "wakes itself up" on the basis of a state change of the controlled unit 6.

In a passenger-carrying vehicle, for example, each door module may have its own associated bus system of the type illustrated in FIG. 1. Each bus system automatically controls and monitors its associated door module. The individual bus systems for the door modules (normally two to five for a passenger-carrying vehicle) are connected to one another via the vehicle bus 5. If, for example, a vehicle door is now unlocked, the bus slave 2 which is monitoring this door lock registers the fact that the door lock has been unlocked. It thus transmits an appropriate message to the bus master 1. The bus master 1 then in turn transmits digital signals to the other bus slaves 2, so that, for example, the electric window winder is also activated. Furthermore, the bus master 1 transmits a message via the vehicle bus 5 to the bus masters of the other bus systems that "its" door has been unlocked. On the basis of the "central locking system" functionality, these bus masters now "wake up" their bus systems, so that the other door locks are also unlocked. Normally, the vehicle is started shortly after this. The vehicle generator in consequence produces electrical power so that the battery is not drained by the bus systems continuing to remain in the normal mode.

According to the exemplary embodiment, the bus slaves 2 switch to the energy saving mode on the basis of an appropriate control command being transmitted by the bus master 1. However, alternatively, it would also be possible for the bus slaves 2 to monitor for the end of the normal cycle time, and to switch themselves to the energy saving mode automatically when this time elapses.

Furthermore, according to the exemplary embodiment, data transmission via the power supply lines 7 ceases completely in the energy saving mode. Alternatively, it would also be possible for the data transmissions to be continued at a lower sampling rate. The sampling rate can in this case, if required, be reduced in a number of steps. In this situation, the bus master 1 transmits digital signals to the bus slaves 2 in the energy saving mode at the latest after an energy saving cycle time which is longer than the normal cycle time has elapsed. These bus slaves 2 respond—as in the normal mode—by transmitting digital signals back to the bus master 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A serial bus system comprising:

a bus master; and at least one bus slave, connected to the bus master via at least one bus line, the bus system being operable in a normal mode in which, at the latest after a normal cycle time has elapsed, the bus master transmits digital signals to the at least one bus slave, and the at least one bus slave transmits digital signals back to the bus master after each such transmission, with each of the transmitted digital signals being interpreted as a logic zero when a first predetermined current waveform is applied to the bus line, and being interpreted as a logic one when a second predetermined current waveform, which is different to the first predetermined current waveform, is applied to the bus line, and operable in an energy saving mode in which the bus master does not transmit any digital signals to the at least one bus slave within the normal cycle time.

2. The bus system as claimed in claim 1, wherein, in the energy saving mode and at the latest after an energy saving cycle time has elapsed, which is longer than the normal cycle time, the bus master transmits digital signals to the at least one bus slave, and the at least one bus slave transmits digital signals back to the bus master after each such transmission.

3. The bus system as claimed in claim 1, wherein in the energy saving mode, the bus master no longer transmits any digital signals to the at least one bus slave.

4. The bus system as claimed in claim 3, wherein in the energy saving mode, at least the at least one bus slave monitors the bus line for an application of at least one of the first and the second predetermined current waveforms, and wherein the at least one bus slave switches back to the normal mode upon detection of the application of at least one of the first and the second predetermined current waveforms.

5. The bus system as claimed in claim 3, wherein in at least the energy saving mode, at least one of the first and the second predetermined current waveforms can be applied automatically to the bus line by the at least one bus slave, and wherein in the energy saving mode, the bus master monitors the bus line for an application of the at least one of the first and the second predetermined current waveforms, and the bus master switches back to the normal mode upon detection of the application of the at least one of the first and the second predetermined current waveforms.

6. The bus system as claimed in claim 1, wherein in order to switch the at least one bus slave to the energy saving mode, the bus master transmits a switching signal to the at least one bus slave.

7. The bus system as claimed in claim 1, wherein the at least one bus slave monitors for the end of the normal cycle time, and the at least one bus slave automatically switches to the energy saving mode when the normal cycle time elapses.

8. The bus system as claimed in claim 1 wherein a predetermined zero current level is applied to the bus line in order to apply the first predetermined current waveform during a zero time, and a predetermined one current level is applied to the bus line in order to apply the second predetermined current waveform during a one time which is different than the zero time.

9. The bus system as claimed in claim 8, wherein a current pause exists between an application of the zero current level and an application of the one current level.

10. The bus system as claimed in claim 9, wherein the zero current level is equal to the one current level.

11. The bus system as claimed in claim 1, wherein said bus system is used in a motor vehicle.

12. The bus system as claimed in claim 11, wherein said bus system is used in a passenger-carrying motor vehicle.

13. The bus system as claimed in claim 4, wherein in at least the energy saving mode, at least one of the first and the second predetermined current waveforms can be applied automatically to the bus line by the at least one bus slave, and wherein in the energy saving mode, the bus master monitors the bus line for the application of the at least one of the first and the second predetermined current waveforms, and the bus master switches back to the normal mode upon detection of the application of the at least one of the first and the second predetermined current waveforms.

14. The bus system as claimed in claim 2, wherein in order to switch the at least one bus slave to the energy saving mode, the bus master transmits a switching signal to the at least one bus slave.

15. The bus system as claimed in claim 2, wherein the at least one bus slave monitors for the end of the normal cycle time, and the at least one bus slave automatically switches to the energy saving mode when the normal cycle time elapses.

16. The bus system as claimed in claim 2, wherein a predetermined zero current level is applied to the bus line in order to apply the first predetermined current waveform during a zero time, and a predetermined one current level is applied to the bus line in order to apply the second predetermined current waveform during a one time which is different than the zero time.

17. The bus system as claimed in claim 2, wherein said bus system is used in a motor vehicle.

* * * * *